(12) United States Patent
Schmidt et al.

(10) Patent No.: US 8,455,090 B2
(45) Date of Patent: Jun. 4, 2013

(54) PREPEGS AND MOLDED BODIES PRODUCED THEREOF AT LOW TEMPERATURE

(75) Inventors: Friedrich Georg Schmidt, Haltern am See (DE); Emmanouil Spyrou, Schermbeck (DE); Werner Grenda, Herne (DE); Sebastian de Nardo, Gelsenkirchen (DE); Sibylle Planitz-Penno, Schwerte (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/256,359

(22) PCT Filed: Feb. 5, 2010

(86) PCT No.: PCT/EP2010/051416
§ 371 (c)(1),
(2), (4) Date: Sep. 13, 2011

(87) PCT Pub. No.: WO2010/108723
PCT Pub. Date: Sep. 30, 2010

(65) Prior Publication Data
US 2012/0003890 A1  Jan. 5, 2012

(30) Foreign Application Priority Data
Mar. 24, 2009 (DE) .................. 10 2009 001 806

(51) Int. Cl.
*D03D 9/00* (2006.01)
*B32B 3/00* (2006.01)
*A01K 1/015* (2006.01)

(52) U.S. Cl.
USPC .... 428/297.4; 442/59; 428/292.1; 428/299.1; 428/299.4; 428/299.7

(58) Field of Classification Search
None
See application file for complete search history.

(56) References Cited

U.S. PATENT DOCUMENTS

| 4,138,372 A | 2/1979 | Nishikawa et al. |
| 4,596,835 A | 6/1986 | Werner et al. |
| 6,007,752 A | 12/1999 | Scherzer et al. |
| 6,008,150 A * | 12/1999 | Thyssen et al. ............... 442/417 |
| 2003/0153713 A1 | 8/2003 | Spyrou et al. |
| 2005/0003206 A1 | 1/2005 | Spyrou et al. |
| 2008/0015274 A1* | 1/2008 | Burdeniuc et al. ............ 521/118 |
| 2008/0265201 A1* | 10/2008 | Spyrou et al. ................ 252/8.57 |
| 2011/0039030 A1* | 2/2011 | Spyrou ........................ 427/389 |

FOREIGN PATENT DOCUMENTS

| EP | 0 806 444 | 11/1997 |
| EP | 1 334 987 | 8/2003 |
| EP | 1 475 399 | 11/2004 |
| JP | 9 194764 | 7/1997 |
| WO | 98 31535 | 7/1998 |
| WO | WO2009/156282 | * 12/2009 |
| WO | WO2009156282 | * 12/2009 |

OTHER PUBLICATIONS

International Search Report Issued May 20, 2010 in PCT/EP10/051416 filed Feb. 5, 2010.
U.S. Appl. No. 13/256,394, filed Sep. 13, 2011, Schmidt, et al.

* cited by examiner

*Primary Examiner* — Jennifer Chriss
*Assistant Examiner* — Camie Thompson
(74) *Attorney, Agent, or Firm* — Oblon, Spivak, McClelland, Maier & Neustadt, L.L.P.

(57) ABSTRACT

The invention relates to prepregs and composite components (molding) produced therefrom at a low temperature, obtainable by using powdery highly reactive polyurethane compositions containing uretdione groups, with specific catalysts.

18 Claims, 2 Drawing Sheets

PREPEGS AND MOLDED BODIES PRODUCED THEREOF AT LOW TEMPERATURE

CROSS-REFERENCE TO RELATED APPLICATIONS

The present application is a 35 U.S.C. §371 National Stage patent application of International patent application PCT/EP2010/051416, filed on Feb. 5, 2010, which claims priority to German patent application DE 102009001806.9, filed on Mar. 24, 2009.

BACKGROUND OF THE INVENTION

The invention relates to prepregs and composite components (mouldings) produced therefrom at a low temperature, obtainable by use of powdery highly reactive polyurethane compositions containing uretdione groups, with specific catalysts.

Various moulding processes, such as for example the reaction transfer moulding (RTM) process, comprise the introduction of the reinforcing fibres into a mould, the closing of the mould, the introduction of the crosslinkable resin formulation into the mould and the subsequent crosslinking of the resin, typically by application of heat.

One of the limitations of such a process is the relative difficulty of laying the reinforcing fibres in the mould. The individual layers of the fabric or non-woven must be cut to size and adapted to the different mould geometries. This can be both time-consuming and complicated, in particular when the mouldings are also intended to contain foam or other cores. Mouldable fibre reinforcements with simple handling and pre-existing reshaping possibilities would be desirable here.

Fibre reinforced materials in the form of prepregs are already used in many industrial applications because of their ease of handling and the increased efficiency during processing in comparison to the alternative wet lay-up technology.

Industrial users of such systems, as well as faster cycle times and higher storage stabilities even at room temperature, also demand the possibility of cutting the prepregs to size, without the cutting tools becoming contaminated with the often sticky matrix material during automated cutting to size and lay-up of the individual prepreg layers.

As well as polyesters, vinyl esters and epoxy systems, there are a range of specialized resins in the field of the crosslinking matrix systems. These also include polyurethane resins, which because of their toughness, damage tolerance and strength are used in particular for the production of composite profiles by pultrusion processes. The toxicity of the isocyanates used is often mentioned as a disadvantage.

Polyurethane composites also exhibit superior toughness compared to vinyl esters, unsaturated polyester resins (UPR) or UPR-urethane hybrid resins.

Prepregs and composites produced therefrom on the basis of epoxy systems are for example described in WO 98/50211, U.S. Pat. No. 4,992,228, U.S. Pat. No. 5,080,857, U.S. Pat. No. 5,427,725, GB 2007676, GB 2182074, EP 309 221, EP 297 674, WO 89/04335, U.S. Pat. No. 5,532,296 and U.S. Pat. No. 4,377,657, U.S. Pat. No. 4,757,120.

In WO 2006/043019, a process for the production of prepregs on the basis of epoxy resin polyurethane powders is described.

Furthermore, prepregs based on thermoplastics in powder form as the matrix are known.

In US 2004/0231598, a method is described wherein the particles are passed through a special acceleration chamber with electrostatic charging. This device is used for the coating of glass, aramid or carbon fibre substrates for the production of prepregs from thermoplastic resins. As resins, polyethylene (PE), polypropylene (PP), polyether ether ketone (PEEK), polyether sulphone (PES), polyphenyl sulphone (PPS), polyimide (PI), polyamide (PA), polycarbonate (PC), polyethylene terephthalate (PET), polyurethane (PU), polyester and fluoro polymers are mentioned. The thermoplastic prepreg textiles produced therefrom exhibit inherent toughness, good viscoelastic damping behaviour, unlimited storage life, and good chemicals resistance and recyclability.

In WO 98/31535, a method for powder impregnation is described, wherein the glass or carbon fibre strands to be impregnated are impacted with a particle/liquid or particle/gas mixture in a defined velocity profile. In this, the powders consist of ceramic or thermoplastic materials, inter alia thermoplastic polyurethane.

In WO 99/64216, prepregs and composites and a method for the production thereof are described, wherein emulsions with polymer particles so small that individual fibre coating is enabled are used. The polymers of the particles have a viscosity of at least 5000 centipoises and are either thermoplastics or crosslinking polyurethane polymers.

In EP 0590702, powder impregnations for the production of prepregs are described, wherein the powder consists of a mixture of a thermoplastic and a reactive monomer or prepolymers.

WO 2005/091715 likewise describes the use of thermoplastics for the production of prepregs.

Michaeli et al. describe the development of a powder technology for a pultrusion process with thermoplastic polyurethanes, referred to as TPU, in Coatings & Composite Materials, No. 19, p 37-39, 1997.

Further, in the article Processing and properties of thermoplastic polyurethane prepreg. (Ma, C. C. M.; Chiang, C. L. Annual Technical Conference—Society of Plastics Engineers (1991), 49th 2065-9.) thermoplastic polyurethane (TPU) prepregs based on TPU systems containing solvents and water are disclosed.

Prepregs with a matrix based on 2-component polyurethanes (2-C PUR) are known.

The category of the 2-C PUR essentially comprises the standard reactive polyurethane resin systems. In principle, this is a system made up of two separate components. While the critical ingredient of one component is always a polyisocyanate, in the case of the second this is polyols, or with recent developments also amino- or amine-polyol mixtures. The two parts are only mixed together shortly before processing. Thereafter the chemical curing takes place by polyaddition with formation of a network of polyurethane or polyurea.

After mixing of the two components, 2-component systems have a limited processing time (stand time, pot life), as the reaction that sets in leads to a gradual viscosity increase and finally to gelling of the system. However, many factors determine the effective duration of its processability: reactivity of the reaction partners, catalysis, concentration, solubility, moisture content, NCO/OH ratio and ambient temperature are the most important [Lackharze, Stoye/Freitag, Hauser-Verlag 1996, pages 210/212].

The disadvantage of the prepregs based on such 2-C PUR systems is that only a short time is available for the processing of the prepreg into a composite. Consequently such prepregs are not stable over several hours, let alone days.

Below there follows a description of the polyurethane prepregs or composites based on 2-C PUR systems.

In the article by K. Recker, the development of a 2-C polyurethane system for the resin mat process with particular reference to the processing properties for SMC components is reported. (Baypreg—a novel POLYURETHANE material for the resin mat process, Recker, Klaus, Kunststoffe-Plastics 8, 1981).

WO 2005/049301 discloses a catalytically activated 2-C PUR system, wherein the poly-isocyanate component and the polyol are mixed and processed into a composite by pultrusion.

In WO 2005/106155, fibre reinforced composites for the construction industry are disclosed, which are produced by the long fibre injection (LFI) technology with 2-C polyurethane systems.

In JP 2004196851, composites are described which are produced from carbon fibres and organic fibres, such as for example hemp, with the use of a matrix of 2-C PUR based on polymeric methylenediphenyl diisocyanate (MDI) and specific OH group-containing compounds.

EP 1 319 503 describes polyurethane composites wherein special polyurethane covering layers for a fibre laminate impregnated with a 2-C PUR resin, which coats a core layer (e.g. a paper honeycomb) are used. The 2-C PUR resin for example consists of MDI and a mixture of polypropylene triols and diols from ethylene oxide propylene oxide copolymers.

In WO 2003/101719, polyurethane-based composites and the methods of production are described. These are 2-C polyurethane resins with defined viscosities and specific gel times.

2-C PUR systems are also discussed in: "Fiber reinforced polyurethane composites: shock tolerant components with particular emphasis on armor plating" (Ratcliffe, Colin P.; Crane, Roger M.; Santiago, Armando L., AMD (1995), 211 (Innovative Processing and Characterization of Composite Materials), 29-37.) and in Fiber-reinforced polyurethane composites. I. Process feasibility and morphology. (Ma, Chen Chi M.; Chen, Chin Hsing. International SAMPE Symposium and Exhibition (1992), 37 (Mater. Work. You 21st Century), 1062-74.)

Apart from the different binder basis, moisture-curing lacquers largely correspond to analogous 2-C systems both in their composition and also in their properties. In principle, the same solvents, pigments, fillers and auxiliary substances are used. Unlike 2-C lacquers, for stability reasons these systems tolerate no moisture whatsoever before their application. Also known are physically drying systems based on non-reactive PUR elastomers. These are high molecular weight, linear, thermoplastic urethanes from diols and diisocyanates, preferably MDI, TDI, HDI and IPDI. Such thermoplastic systems as a rule exhibit very high viscosities and hence also very high processing temperatures. This critically hinders their use for prepregs.

In the production of prepregs with fibre composites, the use of powders in reactive systems is more unusual and until now has been limited to a few use fields. Probably the most common process for applying a powder onto a fibre surface is the fluidized bed process (fluidized bed impregnation). By means of an upwardly directed flow, powder particles are converted to a state wherein they exhibit fluid-like properties. This process is used in EP 590 702. In this, the strands of individual fibre bundles are floated apart and coated with the powder in the fluidized bed. The powder here consists of a mixture of reactive and thermoplastic powder, in order thus to optimize the properties of the matrix. Finally, individual rovings (fibre bundles) are laid together and several layers compressed under a pressure of 16 bar for about 20 minutes. The temperatures vary between 250 and 350° C. However, in the fluidized bed process irregular coating often occurs, in particular if the strands are not pulled apart. Concerning this, in US 20040231598 a method is proposed which functions similarly to the fluidized bed process. In this, an air flow transports the particles to the substrate and a uniform deposition of the powder is effected through a specific configuration.

A further process is described in US 20050215148. There uniform distributions of the powder on the fibres are achieved with the device just mentioned. In this, the particle size ranges from 1 to 2000 µm. In several experiments, coating is effected from one or from two sides. Through the uniform application of the powder, laminates with no air inclusions are obtained after subsequent compression of the prepreg.

A further application, WO 2006/043019, describes the use of epoxy and amino-terminated resins in powder form. In this, the powders are mixed and applied onto the fibres. Next, the particles are sintered on. The particle size lies between 1 and 3000 µm, but preferably between 1 and 150 µm.

This restriction of the particle size to rather small diameters is also recommended in a study by the Michigan State University. The theory here is that particles with small diameters will more likely be able to penetrate into cavities between individual filaments than particles with larger diameters (S. Padaki, L. T. Drzal: a simulation study on the effects of particle size on the consolidation of polymer powder impregnated tapes, Department of Chemical Engineering, Michigan State University, Composites: Part A (1999), pp. 325-337).

Apart from the prepreg technology, reactive powder systems are also used in other standard processes, for example in winding technology [M. N. Ghasemi Nejhad, K. M. Ikeda: Design, manufacture and characterization of composites using on-line recycled thermoplastic powder impregnation of fibres and in-situ filament winding, Department of Mechanical Engineering, University of Hawaii at Manoa, Journal of Thermoplastic Composite Materials, Vol 11, pp. 533-572, November 1998] or in the pultrusion process. For the pultrusion process for example fibre strands (towpregs) are coated with the powder and firstly wound and stored as so-called towpregs. One possibility for their production is described in an article in the SAMPE Journal [R. E. Allred, S. P. Wesson, D. A. Babow: powder impregnation studies for high temperature towpregs, Adherent Technologies, SAMPE Journal, Vol. 40, No. 6, pp. 40-48, November/December 2004]. In a further study, such towpregs were pressed together by the pultrusion process and cured to give material components [N. C. Parasnis, K. Ramani, H. M. Borgaonkar: Ribbonizing of electrostatic powder spray impregnated thermoplastic tows by pultrusion, School of Mechanical Engineering, Purdue University, Composites, Part A, Applied science and manufacturing, Vol. 27, pp. 567-574, 1996]. Although the production of towpregs and subsequent compression in the pultrusion process had already been performed with duroplastic systems, to a large extent only thermoplastic systems have until now been used in this process.

The objective was to find a prepregs system which can be handled without difficulty, i.e. is non-toxic, and which does not have the high viscosities of thermoplastic polyurethane systems with the attendant difficulties of fibre saturation and fabric saturation, and which does not have the short processing times of 2C polyurethane systems. A further objective of this invention was therefore to find prepregs with polyurethane matrix material which can be produced by a simple process, wherein the main emphasis should be placed on the handling and storage life of the prepregs.

BRIEF SUMMARY OF THE INVENTION

For the prepregs according to the invention it is advantageous if the viscosity of the noncrosslinked matrix materials is low enough to ensure wetting of the fibrous support during the production of the composite component, during which thixotropy can also be advantageous, so that run-off of the resin in vertical component segments can be prevented. Through the choice of suitable starting materials for production of the matrix materials, a sufficiently long processing time (depending on the particular application in the production of the composites) between the melting of the not completely reacted matrix material and the completion of the reaction can be ensured.

Surprisingly, it has now been found that, by using powdery polyurethane compositions which contain uretdione groups and which are highly reactive, i.e. can be hardened at temperatures below 160° C., it is possible to produce polyurethane-based prepregs which are storage-stable, but are still reactive and can therefore be crosslinked during composite component production, which prepregs can be used for the production of high performance composites for various applications in the sector of the construction, automobile, aerospace industry, energy technology (wind power plants) and in boat and ship-building. The highly reactive powdery polyurethane compositions present according to the invention, containing uretdione groups, are environmentally compatible, have good mechanical properties, are easy to process, and, after curing at temperatures below 160° C., feature good weather resistance and a balanced relationship between rigidity and flexibility.

The subject matter of the invention is prepregs, essentially made up of
A) at least one fibrous support
and
B) at least one highly reactive powdery polyurethane composition containing uretdione groups, as matrix material, essentially containing
   a) at least one curing agent containing uretdione groups
   and
   b) optionally at least one polymer with functional groups reactive towards NCO groups;
   c) 0.1 to 5 wt. % of at least one catalyst selected from quaternary ammonium salts and/or quaternary phosphonium salts with halogens, hydroxides, alcoholates or organic or inorganic acid anions as the counter-ion;
   and
   d) 0.1 to 5 wt. % of at least one cocatalyst, selected from
      d1) at least one epoxide
      and/or
      d2) at least one metal acetylacetonate and/or quaternary ammonium acetylacetonate and/or quaternary phosphonium acetylacetonate;
   e) optionally auxiliary substances and additives known from polyurethane chemistry.

Preferred subject matter of the present invention is prepregs, essentially made up of
A) at least one fibrous support
and
B) at least one highly reactive powdery polyurethane composition containing uretdione groups, as matrix material, essentially containing
   a) at least one curing agent containing uretdione groups, based on polyaddition compounds from aliphatic, (cyclo)aliphatic or cycloaliphatic polyisocyanates containing uretdione groups and hydroxyl group-containing compounds, wherein the curing agent exists in solid form below 40° C. and in liquid form above 125° C. and has a free NCO content of less than 5 wt. % and a uretdione content of 3-25 wt. %,
   b) at least one hydroxyl group-containing polymer, which exists in solid form below 40° C. and in liquid form above 125° C. and has an OH number between 20 and 200 mg KOH/gram;
   c) 0.1 to 5 wt. % of at least one catalyst selected from quaternary ammonium salts and/or quaternary phosphonium salts with halogens, hydroxides, alcoholates or organic or inorganic acid anions as the counter-ion; and
   d) 0.1 to 5 wt. % of at least one cocatalyst, selected from
      d1) at least one epoxide
      and/or
      d2) at least one metal acetylacetonate and/or quaternary ammonium acetylacetonate and/or quaternary phosphonium acetylacetonate;
   e) optionally auxiliary substances and additives known from polyurethane chemistry,
   so that the two components a) and b) are present in the ratio such that for every hydroxyl group of the component b) 0.3 to 1 uretdione group of the component a) is consumed, preferably 0.6 to 0.9.
   The latter corresponds to an NCO/OH ratio of 0.6 to 2 to 1 or 1.2 to 1.8 to 1.

DETAILED DESCRIPTION OF THE INVENTION

Figure 1:
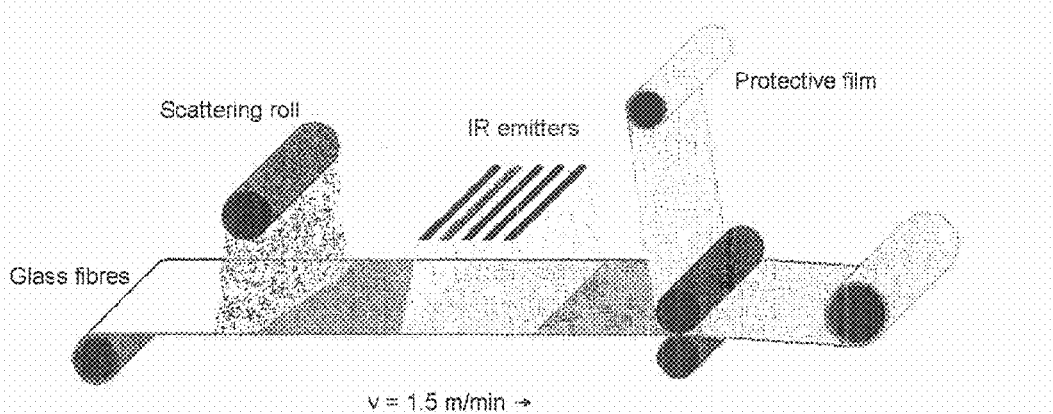
FIG. 1 depicts laboratory scattering equipment used in the examples.

The prepregs according to the invention have very high storage stability at room temperature, where the matrix material has a Tg of at least 40° C. The said stability amounts to at least some days or weeks at room temperature, varying with the highly reactive powdery polyurethane composition present, but the prepregs are generally storage-stable for some days at 40° C. and below.

After application and fixing, preferably by thermal treatment, preferably by incipient sintering of the highly reactive powdery polyurethane composition, but without crosslinking, the prepregs are not sticky and are thus very easy to handle and to process further. The highly reactive powdery polyurethane compositions used according to the invention and containing uretdione groups accordingly exhibit very good adhesion and distribution on the fibrous support.

During the further processing of the prepregs to composites (composite materials) e.g. by compression at elevated temperatures, very good impregnation of the fibrous support takes place owing to the fact that the reactive polyurethane compositions which contain uretdione groups and which are liquid here, with low viscosity, wet the fibres of the support very well before the crosslinking reaction, before a gelling occurs or the complete polyurethane matrix cures throughout due to the crosslinking reaction of the highly reactive polyurethane composition at elevated temperatures.

The speed of the crosslinking reaction during production of the composite components, and also the properties of the matrix, can be varied widely as a function of the constitution of the highly reactive powdery polyurethane composition used, containing uretdione groups, and of added catalysts.

Defined as matrix material in the context of the invention is the highly reactive powdery polyurethane composition used for the production of the prepregs and, in the description of the prepregs, the still highly reactive polyurethane composition fixed or adhering to the fibres. The matrix is defined as the matrix materials crosslinked in the composite from the highly reactive powdery polyurethane compositions containing uretdione groups.

Support

The fibrous support in the present invention consists of fibrous material (also often referred to as reinforcing fibres). In general any material of which the fibres consist is suitable, however fibrous material of glass, carbon, plastics, such as for example polyamide (aramid) or polyester, natural fibres or mineral fibre materials such as basalt fibres or ceramic fibres (oxide fibres based on aluminium oxides and/or silicon oxides) is preferably used. Mixtures of fibre types, such as for example fabric combinations of aramid- and glass fibres, or carbon and glass fibres, can also be used. Likewise, hybrid composite components can be produced with prepregs from different fibrous supports.

Glass fibres are the most commonly used fibre types mainly owing to their relatively low price. In principle here, all types of glass-based reinforcing fibres are suitable (E glass, S glass, R glass, M glass, C glass, ECR glass, D glass, AR glass, or hollow glass fibres).

Carbon fibres are generally used in high performance composite materials where the lower density with at the same time higher strength compared to glass fibres is also an important factor. Carbon fibres (also carbon fibres) are industrially produced fibres from carbon-containing starting materials which are converted by pyrolysis to carbon in graphite-like configuration. A distinction is made between isotropic and anisotropic types: isotropic fibres have only low strength values and lower industrial significance, anisotropic fibres exhibit high strength and rigidity values with at the same time low elongation at break.

Here, all textile fibres and fibre materials which are obtained from plant and animal material (e.g. wood, cellulose, cotton, hemp, jute, flax, sisal or bamboo fibres) are described as natural fibres.

Aramid fibres, similarly also to carbon fibres, have a negative coefficient of thermal expansion, i.e. become shorter on heating. Their specific strength and their modulus of elasticity is markedly lower than that of carbon fibres. In combination with the positive coefficient of expansion of the matrix resin, highly dimensionally stable components can be manufactured. Compared to carbon fibre reinforced plastics, the pressure resistance of aramid fibre composite materials is markedly lower. Well-known brand names for aramid fibres are Nomex® and Kevlar® from DuPont, or Teijinconex®, Twaron® and Technora® from Teijin. Supports made of glass fibres, carbon fibres, aramid fibres or ceramic fibres are particularly suitable.

The fibrous material is a planar textile body. Planar textile bodies of non-woven material, likewise so-called knitted goods, such as hosiery and knitted fabrics, but also non-knitted skein such as fabric, non-woven or netting, are suitable. In addition, a distinction is made between long fibre and short fibre materials as supports. Also suitable according to the invention are rovings and yarns. All the said materials are suitable as fibrous supports in the context of the invention.

An overview of reinforcing fibres is contained in "Composites Technologien, Paolo Ermanni (Version 4), Script for Lecture ETH Zurich, August 2007, Chapter 7".

Matrix Material

Suitable powdery highly reactive polyurethane compositions containing uretdione groups according to the invention contain mixtures of temporarily deactivated, i.e. uretdione group-containing (internally blocked) di- or polyisocyanates, also referred to as curing agents a) and the catalysts c) and d) contained according to the invention and optionally in addition a polymer (binder) having functional groups reactive towards NCO groups, also referred to as resin b). The catalysts ensure curing of the polyurethane compositions containing uretdione groups at low temperature. The polyurethane compositions containing uretdione groups are thus highly reactive.

Polyisocyanates containing uretdione groups are well known and are for example described in U.S. Pat. No. 4,476,054, U.S. Pat. No. 4,912,210, U.S. Pat. No. 4,929,724 and EP 417 603. A comprehensive overview of industrially relevant processes for the dimerization of isocyanates to uretdiones is provided by J. Prakt. Chem. 336 (1994) 185-200. In general, the conversion of isocyanates to uretdiones is effected in the presence of soluble dimerization catalysts such as for example dialkylaminopyridines, trialkylphosphines, phosphorous acid triamides or imidazoles. The reaction—optionally performed in solvents, but preferably in the absence of solvents—is stopped by addition of catalyst poisons on attainment of a desired conversion level. Excess monomeric isocyanate is then removed by flash evaporation. If the catalyst is sufficiently volatile, the reaction mixture can be freed from catalyst in the course of the monomer separation. The addition of catalyst poisons can in this case be omitted. Essentially, a broad palette of isocyanates is suitable for the production of polyisocyanates containing uretdione groups. Di- and polyisocyanates from any aliphatic, cycloaliphatic and/or (cyclo)aliphatic di- and/or polyisocyanates are suitable.

Suitable aliphatic di- or polyisocyanates advantageously have 3 to 16 carbon atoms, preferably 4 to 12 carbon atoms, in the linear or branched alkylene residue and suitable cycloaliphatic or (cyclo)aliphatic diisocyanates advantageously have 4 to 18 carbon atoms, preferably 6 to 15 carbon atoms, in the cycloalkylene residue. Those skilled in the art adequately understand (cyclo)aliphatic diisocyanates simultaneously to mean cyclically and aliphatically bound NCO groups, such as is for example the case with isophorone diisocyanate. In contrast to this, cycloaliphatic diisocyanates are understood to mean those which only have NCO groups directly bound to the cycloaliphatic ring, e.g. $H_{12}MDI$. Examples are cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate.

Isophorone diisocyanate (IPDI), hexamethylene diisocyanate (HDI), diisocyanatodicyclo-hexylmethane ($H_{12}MDI$), 2-methylpentane diisocyanate (MPDI), 2,2,4-trimethylhexamethylene diisocyanate/2,4,4-trimethylhexamethylene diisocyanate (TMDI), and norbornane diisocyanate (NBDI) are preferred. IPDI, HDI, TMDI and $H_{12}MDI$ are quite particularly preferably used, the isocyanurates also being usable.

Also suitable are 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropyl-cyclohexyl isocyanate, 2,4'-methylenebis(cyclohexyl) diisocyanate and 1,4-diisocyanato-4-methyl-pentane.

Of course, mixtures of the di- and polyisocyanates can also be used.

Furthermore, oligo- or polyisocyanate which can be produced from the said di- or poly-isocyanates or mixtures thereof by linkage by means of urethane, allophanate, urea, biuret, uretdione, amide, isocyanurate, carbodiimide, uretonimine, oxadiazinetrione or iminooxadiazinedione structures are preferably used. Isocyanurate, in particular from IPDI and HDI, are particularly suitable.

Quite especially preferably, IPDI and HDI are used for the matrix material.

The conversion of these polyisocyanates containing uretdione groups to curing agents a) having uretdione groups comprises the reaction of the free NCO groups with hydroxyl group-containing monomers or polymers, such as for example polyesters, polythioethers, polyethers, polycaprolactams, polyepoxides, polyester amides, polyurethanes or lower molecular weight di-, tri- and/or tetrahydric alcohols as chain extenders and optionally monoamines and/or monohydric alcohols as chain terminators and has already often been described (EP 669 353, EP 669 354, DE 30 30 572, EP 639 598 or EP 803 524). Preference is given to polyesters and monomeric dialcohols. Preferred curing agents a) having uretdione groups have a free NCO content of less than 5 wt. % and a content of uretdione groups of 3 to 25 wt. %, preferably 6 to 18 wt. % (calculated as $C_2N_2O_2$, molecular weight 84). Apart from the uretdione groups the curing agents can also exhibit isocyanurate, biuret, allophanate, urethane and/or urea structures. The curing agents a) are in solid form below 40° C. and are in liquid from above 125° C.

In one preferred embodiment of the invention, polymers b) having functional groups reactive towards NCO groups are present.

Suitable functional groups of the polymers b) (binders) are hydroxyl groups, amino groups and thiol groups which react with the free isocyanate groups by addition and thus crosslink and cure the polyurethane composition. The binder components must be of solid resin nature (glass temperature greater than room temperature). Suitable binders are polyesters, polyethers, polyacrylates, polycarbonates and polyurethanes having functional groups. The quantity of the polymers b) is selected such that for each functional group of the component b) 0.3 to 1.0 uretdione groups of the component a), preferably 0.6 to 0.9, are consumed.

In the case of the particularly preferred hydroxyl group-containing polymers b), polyesters, polyethers, polyacrylates, polyurethanes and/or polycarbonates with an OH number of 20 to 500 mg KOH/g, preferably of 20-200 in mg KOH/gram and an average molecular weight of 250-6000 g/mol, which exist in solid form below 40° C. and in liquid form above 125° C., are preferably used. Such binders have for example been described in EP 669 354 and EP 254 152. Particular preference is given to polyesters or polyacrylates with an OH number of 20 to 150 and an average molecular weight of 500 to 6000 g/mol. Of course, mixtures of such polymers can also be used. The quantity of the hydroxyl group-containing polymers b) is selected such that for every hydroxyl group of the component b) 0.3 to 1.0 uretdione group of the component a), preferably 0.6 to 0.9, is consumed.

As catalysts under c), quaternary ammonium salts, tetralkylammonium salts and/or quaternary phosphonium salts with halogens, hydroxides, alcoholates or organic or inorganic acid anions as the counter-ion, are preferably used. Examples of these are: tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutyl-ammonium benzoate and tetrabutylphosphonium acetate, tetrabutylphosphonium formate and ethyltriphenylphosphonium acetate, tetrabutylphosphonium benzotriazolate, tetraphenyl-phosphonium phenolate and trihexyltetradecylphosphonium decanoate, methyltributyl-ammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctyl-ammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethyl-ammonium hydroxide, trimethylvinylammonium hydroxide, methyltributylammonium methanolate, methyltriethylammonium methanolate, tetramethylammonium methanolate, tetraethylammonium methanolate, tetrapropylammonium methanolate, tetrabutylammonium methanolate, tetrapentylammonium methanolate, tetrahexylammonium methanolate, tetraoctylammonium methanolate, tetradecylammonium methanolate, tetradecyltrihexyl-ammonium methanolate, tetraoctadecylammonium methanolate, benzyltrimethylammonium methanolate, benzyltriethylammonium methanolate, trimethylphenylammonium methanolate, triethylmethylammonium methanolate, trimethylvinylammonium methanolate, methyltributyl-ammonium ethanolate, methyltriethylammonium ethanolate, tetramethylammonium ethanolate, tetraethylammonium ethanolate, tetrapropylammonium ethanolate, tetrabutyl-ammonium ethanolate, tetrapentylammonium ethanolate, tetrahexylammonium ethanolate, tetraoctylammonium methanolate, tetradecylammonium ethanolate, tetradecyltrihexylammonium ethanolate, tetraoctadecylammonium ethanolate, benzyltrimethylammonium ethanolate, benzyltriethylammonium ethanolate, trimethylphenylammonium ethanolate, triethylmethylammonium ethanolate, trimethylvinylammonium ethanolate, methyltributyl-ammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctyl-ammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethyl-ammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethyl-ammonium iodide, benzyltrimethylammonium chloride, benzyltriethylammonium chloride, benzyltripropylammonium chloride, benzyltributylammonium chloride, methyltributyl-ammonium chloride, methyltripropylammonium chloride, methyltriethylammonium chloride, methyltriphenylammonium chloride, phenyltrimethylammonium chloride, benzyltrimethyl-ammonium bromide, benzyltriethylammonium bromide, benzyltripropylammonium bromide, benzyltributylammonium bromide, methyltributylammonium bromide, methyltripropyl-ammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyl-tributylammonium hydroxide, methyltriethylammonium hydroxide, tetramethylammonium hydroxide, tetraethylammonium hydroxide, tetrapropylammonium hydroxide, tetrabutyl-ammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethyl-ammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride. These catalysts can be added alone or in mixtures. Preferably tetraethylammonium benzoate and tetrabutylammonium hydroxide are used.

The content of catalysts c) can be from 0.1 to 5 wt. %, preferably from 0.3 to 2 wt. %, based on the whole formulation of the matrix material.

One modification according to the invention modification also includes the binding of such catalysts c) to the functional groups of the polymers b). In addition, these catalysts can be surrounded with an inert shell and thus be encapsulated.

As cocatalysts d1) epoxides are used. Possible here are for example glycidyl ethers and glycidyl esters, aliphatic epoxides, diglycidyl ethers based on bisphenol A and glycidyl methacrylates. Examples of such epoxides are triglycidyl isocyanurate (TGIC, trade name ARALDITE 810, Huntsman), mixtures of diglycidyl terephthalate and triglycidyl trimellitate (trade name ARALDITE PT 910 and 912, Huntsman), glycidyl esters of versatic acid (trade name KARDURA E10, Shell), 3,4-epoxycyclohexylmethyl 3',4'-epoxycyclohexanecarboxylate (ECC), diglycidyl ethers based on bisphenol A (trade name EPIKOTE 828, Shell) ethylhexylglycidyl ether, butylglycidyl ether, pentaerythritol tetraglycidyl ether, (trade name POLYPOX R16, UPPC AG) and other Polypox types with free epoxy groups. Mixtures can also be used. Preferably ARALDITE PT 910 and 912 are used.

As cocatalysts d2) metal acetylacetonates are possible. Examples thereof are zinc acetylacetonate, lithium acetylacetonate and tin acetylacetonate, alone or in mixtures. Preferably zinc acetylacetonate is used.

As cocatalysts d2) quaternary ammonium acetylacetonates or quaternary phosphonium acetylacetonates are also possible.

Examples of such catalysts are tetramethylammonium acetylacetonate, tetraethylammonium acetylacetonate, tetrapropylammonium acetylacetonate, tetrabutylammonium acetyl-acetonate, benzyltrimethylammonium acetylacetonate, benzyltriethylammonium acetyl-acetonate, tetramethylphosphonium acetylacetonate, tetraethylphosphonium acetyl-acetonate, tetrapropylphosphonium acetylacetonate, tetrabutylphosphonium acetylacetonate, benzyltrimethylphosphonium acetylacetonate and benzyltriethylphosphonium acetyl-acetonate. Particularly preferably, tetraethylammonium acetylacetonate and tetrabutyl-ammonium acetylacetonate are used. Mixtures of such catalysts can of course also be used.

The content of cocatalysts d1) and/or d2) can be from 0.1 to 5 wt. %, preferably from 0.3 to 2 wt. %, based on the whole formulation of the matrix material.

The highly reactive powdery polyurethane compositions containing uretdione groups can optionally comprise additional organometallic catalysts, e.g. dibutyltin dilaurate, tin octoate, bismuth neodecanoate, or else tertiary amines, such as for example 1,4-diaza-bicyclo[2.2.2]-octane, in quantities of 0.001-1 wt. %.

For production of the highly reactive powdery polyurethane compositions containing uretdione groups it is possible to add the additives e) conventionally used in polyurethane chemistry, examples being levelling agents, e.g. polysilicones or acrylates, light screening agents, e.g. sterically hindered amines, or other auxiliary substances such as were for example described in EP 669 353, can be added in a total quantity of 0.05 to 5 wt. %. Fillers and pigments such as for example titanium dioxide can be added in a quantity up to 50 wt. % of the total composition.

Conventional polyurethane compositions containing uretdione groups cannot be cured under normal conditions (DBTL catalysis) at below 160° C., or usually 180° C. (Pieter Gillis de Lange, Powder Coatings and Technology, Vincentz Verlag, 2004, chapter 3.3.2.2 p 119.)

By means of the highly reactive and thus low temperature curing polyurethane compositions used according to the invention, at 100 to 160° C. curing temperature not only can energy and curing time be saved, but many temperature-sensitive supports can also be used.

In the context of this invention, highly reactive means that the polyurethane compositions containing uretdione groups used according to the invention cure at temperatures from 100 to 160° C., depending on the nature of the support. This curing temperature is preferably 120 to 150° C., particularly preferably from 130 to 140° C. The time for the curing of the polyurethane composition used according to the invention lies within from 5 to 60 minutes.

The polyurethane compositions containing highly reactive uretdione groups used according to the invention provide very good flow and hence good impregnation behaviour and in the cured state excellent chemicals resistance. In addition, with the use of aliphatic crosslinking agents (e.g. IPDI or $H_{12}$MDI) good weather resistance is also achieved.

The highly reactive powdery polyurethane compositions containing uretdione groups and used according to the invention as matrix material are solid, powdery and non-sticky at room temperature. They consist in essence of a mixture of a curing agent a), of the catalysts according to the invention, and optionally but preferably they comprise a polymer b) (resin). This mixture has a Tg of at least 40° C. and as a rule reacts only above 100° C. to give a crosslinked polyurethane and thus forms the matrix of the composite. This means that the prepregs according to the invention after their production are made up of the support and the applied highly reactive powdery polyurethane composition as matrix material, which is present in noncrosslinked but reactive form. The prepregs are thus storage-stable, as a rule for several days and even weeks and can thus at any time be further processed into composites. This is the essential difference from the 2-component systems already described above, which are reactive and not storage-stable, since after application these immediately react and crosslink to give polyurethanes.

The homogenization of all components for the production of the polyurethane composition for the production of the prepregs can be effected in suitable units, such as for example heatable stirred kettles, kneaders or even extruders, during which upper temperature limits of 120 to 130° C. for short periods should not be exceeded. The mixing of the individual components is preferably effected in an extruder at temperatures which lie above the melting ranges of the individual components, but below the temperature at which the crosslinking reaction starts. The solidified compositions formed are ground and may be divided into different fractions by screening for example (for example, particle diameter <63 μm, 63-100 μm, >100 μm).

Also subject matter of the invention is the use of the highly reactive powdery polyurethane composition B) according to the invention for producing prepregs, in particular with fibrous supports (fibre reinforcement) of glass, carbon or aramid fibres and the composites produced therefrom.

The prepregs can in principle be produced by any desired processes, preferably by powder impregnation. In the suitable method here, the highly reactive powdery polyurethane composition is applied to the support by a scattering process. Other possibilities are a fluidized-bed sintering process, pultrusion, and a spray process.

In the case of powder impregnation, the matrix material—normally thermoplastic polymer—is present in powder form. In order to minimize flow paths for the highly viscous melt of thermoplastic matrix systems for wetting and encapsulating the fibres, the usual method in the prior art is to disperse the thermoplastic powder in a stream of air in the fluidized-bed process and to use the air stream to spread the filaments of yarn. The individual powder particles can thus reach the individual fibres. The adhesion of the powder can be additionally improved by electrostatic charging of the powder. After passage through the fluidized bed, the filaments of yarn, with the likely adhering powder, are passed through a heating section in which incipient melting of the matrix polymer powder takes place. A consolidation step is then required in the production of the composite components to complete the wetting of the filaments.

In the case of the use according to the invention of the highly reactive powdery polyurethane composition according to the invention, processes of this type for flow-path shortening are not essential, since the melt of the prepolymers (uncrosslinked powder coating melt) has a low viscosity suitable for permitting the wetting of the fibres, and this represents a considerable advantage of the prepregs according to the invention in comparison with the prior art.

The powder (all or one fraction) is preferably applied by way of scattering processes to the fibrous support, e.g. to webs made of glass nonwoven/fabric, of carbon nonwoven/fabric, or of aramid nonwoven/fabric, and then fixed. In order to avoid powder losses, it is preferable that the fibrous support treated with powder is heated directly after the scattering procedure in a heating section (e.g. using IR sources), so that incipient sintering of the particles takes place, but temperatures of from 80 to 100° C. should not be exceeded here, in order to inhibit incipient reaction of the highly reactive matrix material. These prepregs can, if necessary, be cut to shape and combined to give various forms.

The invention provides a process for producing prepregs by application of component B), preferably by scattering processes, to component A), and optional fixing of B), preferably by exposure to heat, particularly preferably by incipient sintering.

In order to consolidate the prepreg sublayers to give a single composite (component), and in order to crosslink the matrix material according to the invention to give the matrix, the prepregs are cut to size, and optionally fixed by sewing or other means, and pressed in a suitable mould under pressure and optionally with application of vacuum. For the purposes of this invention, this procedure for producing the composites from the prepregs according to the invention takes place at temperatures above about 100° C. to 160° C., varying with the hardening time.

Also subject matter of the invention is the use of the prepregs essentially made up of A) at least one fibrous support and B) at least one highly reactive powdery polyurethane composition containing uretdione groups, as matrix material, essentially containing a) at least one curing agent containing uretdione groups and b) optionally at least one polymer with functional groups reactive towards NCO groups;

c) 0.1 to 5 wt. % of at least one catalyst selected from quaternary ammonium salts and/or quaternary phosphonium salts with halogens, hydroxides, alcoholates or organic or inorganic acid anions as the counter-ion;

and d) 0.1 to 5 wt. % of at least one cocatalyst, selected from d1) at least one epoxide and/or d2) at least one metal acetylacetonate and/or quaternary ammonium acetylacetonate and/or quaternary phosphonium acetylacetonate;

e) optionally auxiliary substances and additives known from polyurethane chemistry.

for the production of composites in boat and shipbuilding, in aerospace technology, in automobile manufacture, and for bicycles, preferably motorcycles and cycles, and in the automotive, construction, medical engineering, sport, electrical and electronics industry sectors, and power generating plants, e.g. for rotor blades in wind power plants.

Also subject matter of the invention are the composite components produced from the prepregs according to the invention, essentially made up of A) at least one fibrous support and B) at least one crosslinked polyurethane composition containing uretdione groups constituted according to the invention, as matrix.

Also subject matter of the invention is a process for producing composite components, in which a prepreg made up of A) at least one fibrous support and B) at least one highly reactive powdery polyurethane composition containing uretdione groups, as matrix material, essentially containing a) at least one curing agent containing uretdione groups and b) optionally at least one polymer with functional groups reactive towards NCO groups;

c) 0.1 to 5 wt. % of at least one catalyst selected from quaternary ammonium salts and/or quaternary phosphonium salts with halogens, hydroxides, alcoholates or organic or inorganic acid anions as the counter-ion; and d) 0.1 to 5 wt. % of at least one cocatalyst, selected from
   d1) at least one epoxide
   and/or
   d2) at least one metal acetylacetonate and/or quaternary ammonium acetylacetonate and/or quaternary phosphonium acetylacetonate;

e) optionally auxiliary substances and additives known from polyurethane chemistry, is produced at temperatures of over 100° C. up to 160° C., optionally while using pressure and/or vacuum.

Below, the invention is illustrated by examples.

Examples

Depiction of Laboratory Scattering Equipment Used (Villars Minocoater 200) FIG. 1
Glass Fibre Nonwovens/Fabrics Used:

The following glass fibre nonwovens and glass fibre fabrics were used in the examples and are referred to below as type I and type II.

Type I is a linen E glass fabric 281 L Art. No. 3103 from "Schlösser & Cramer". The fabric has an areal weight of 280 g/m².

Type II GBX 600 Art. No. 1023 is a sewn biaxial E glass nonwoven (−45/+45) from "Schlösser & Cramer". This should be understood to mean two layers of fibre bundles which lie one over the other and are set at an angle of 90 degrees to one another. This structure is held together by other fibres, which do not however consist of glass. The surface of the glass fibres is treated with a standard size which is aminosilane-modified. The nonwoven has an areal weight of 600 g/m².

DSC Measurements

The DSC tests (glass transition temperature determinations and enthalpy of reaction measurements) were performed with a Mettler Toledo DSC 821e as per DIN 53765.

Highly Reactive Powdery Polyurethane Composition

A highly reactive powdery polyurethane composition with the following formula was used for the production of the prepregs and the composites.

| (Data in % by weight): | |
|---|---|
| Examples | Formulation NT (according to invention) |
| VESTAGON BF 9030 (uretdione group-containing curing agent component a)), Evonik Degussa | 33.04 |
| FINEPLUS PE 8078 VKRK20 (OH-functional polyester resin component b)), DIC Co. | 63.14 |
| BYK 361N | 0.5 |
| Vestagon SC 5050, Tetraethylammonium benzoate-containing catalyst c)), Evonik Degussa | 1.52 |
| Araldite PT 912, (epoxy component d)), Huntsman | 1.80 |
| NCO:OH ratio | 1.4:1 |

The milled ingredients from the table are intimately mixed in a premixer and then homogenized in the extruder up to a maximum of 130° C. After cooling, the extrudate is broken and ground using a pinned-disc mill. The average particle diameters of the sieve fractions used were from 63 to 100 μm.

| Physical properties | |
|---|---|
| | NT powder |
| $T_g$ [° C.] | about 45 |
| Melting range [° C.] | about 84 |
| Hardening temperature [° C.] | 120-140 |
| Elongation at break of hardened polyurethane matrix [%] | 9 |
| modulus of elasticity of hardened polyurethane matrix [MPa] | about 610 |
| Volume shrinkage through crosslinking | <0.2% |
| Viscosity minimum of uncrosslinked melt | 111° C./330 Pa · s |

Selection of suitable sinter conditions during various preliminary experiments showed that the following settings have good suitability for producing the prepregs on a minicoater:

About 150 g/powder were applied to one square metre of glass fibre nonwoven, using a web speed of about 1.2 m/min. This corresponds to a layer thickness of about 500 μm with a standard deviation of about 45 μm.

Using a power level of 560 W for the IR source, prepregs could be produced by this method at temperatures of from 75 to 82° C., by incipient sintering of the highly reactive powdery polyurethane composition, and it was of no significance here whether the incipient sintering of the powders was carried out while the structure of the powder remained discernible or whether a complete melt was produced on the glass fibre nonwoven, as long as the reactivity of the powdery polyurethane composition was retained.

Storage Stability of the Prepregs

Figure 2:
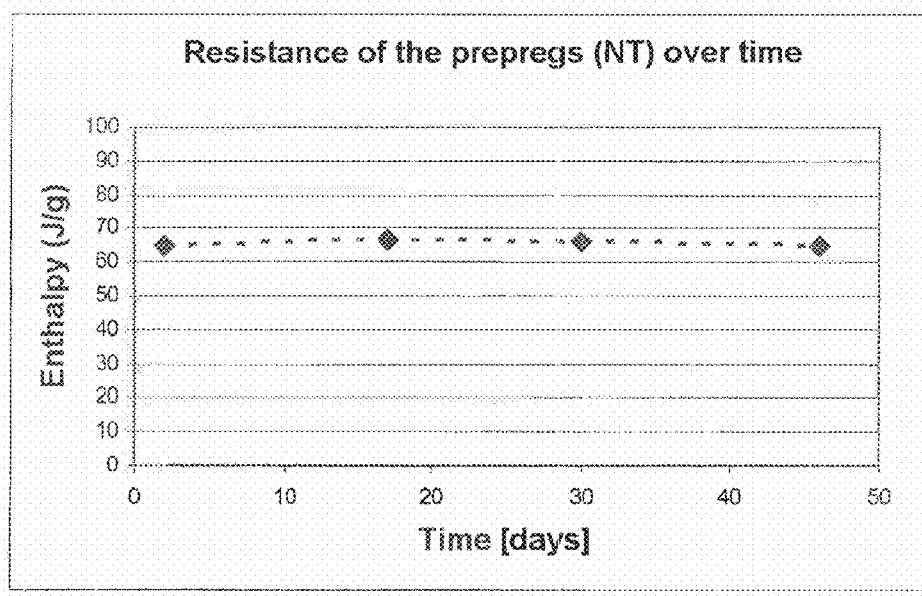
FIG. 2 is a graph of resistance enthalpy (J/g) versus time.
Figure 3:
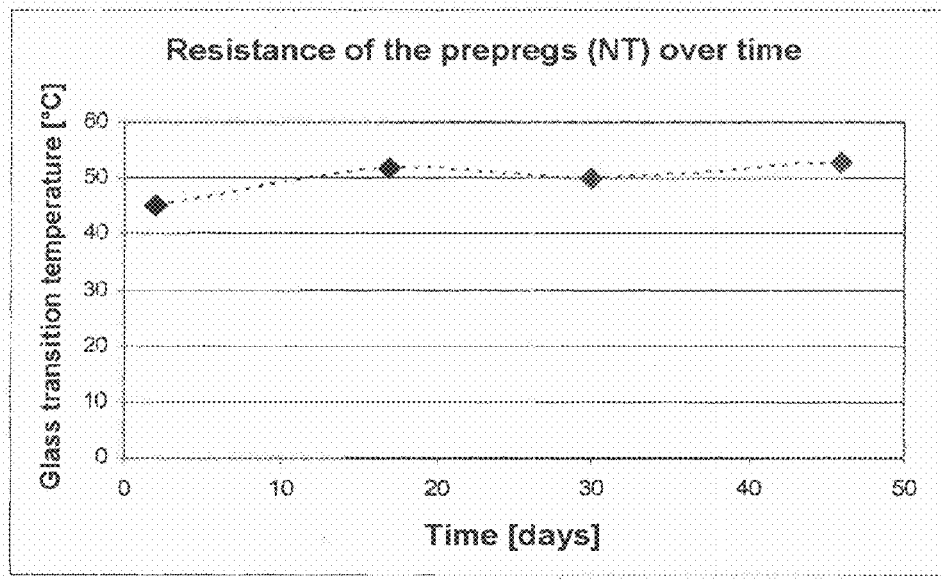
FIG. 3 is a graph of glass transition temperature (° C.) versus time.

The storage stability of the prepregs was determined from the enthalpies of reaction of the crosslinking reaction by means of DSC studies. The results are shown in FIG. 2 and FIG. 3.

The crosslinking capacity of the PU prepregs is not impaired by storage at room temperature for a period of at least 7 weeks.

Composite Component Production

The composite components were produced on a composite press by a compression technique known to those skilled in the art. The homogeneous prepregs produced on the scattering apparatus were compressed into composite materials on a benchtop press. This benchtop press is the Polystat 200 T from the firm Schwabenthan, with which the prepregs were compressed to the corresponding composite sheets at 130 to 140° C. The pressure was varied between normal pressure and 450 bar. Dynamic compression, i.e. alternating applications of pressure, can prove advantageous for the crosslinking of the fibres depending on the component size, thickness and polyurethane composition and hence the viscosity setting at the processing temperature.

In one example, the temperature of the press was held at 135° C., the pressure was increased to 440 bar after a melting phase of 3 minutes and this level held at until the removal of the composite component from the press after 30 minutes.

Figure 4:
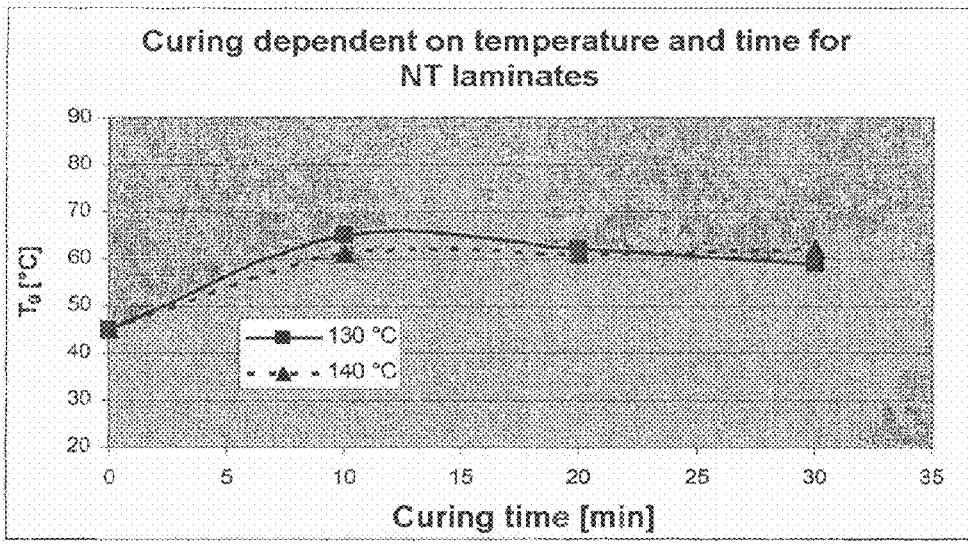
FIG. 4 is a graph of glass transition temperature (° C.) versus curing time at two separate temperatures.

The resultant hard, rigid, chemicals resistant and impact resistant composite components (sheet products) with a fibre volume content of >50% were tested for the degree of curing (determination by DSC). The determination of the glass transition temperature of the cured matrix indicates the progress of the crosslinking at different curing temperatures. With the polyurethane composition used, the crosslinking is complete after ca. 25 minutes, and then an enthalpy of reaction for the crosslinking reaction is also no longer detectable. The results are shown in FIG. 4.

Two composite materials were produced under exactly identical conditions and their properties then determined and compared. This good reproducibility of the properties could also be confirmed in the determination of the interlaminar shear strength (ILSS). Here an averaged ILSS of 44 N/mm² was attained with fibre volume content of 54 or 57% respectively.

The invention claimed is:

1. A prepreg, consisting essentially of
   A) at least one fibrous support, and
   B) a matrix material comprising at least one highly reactive powdery polyurethane composition comprising at least one uretdione group, said composition consisting essentially of:
      a) at least one curing agent comprising at least one uretdione group obtained by polyaddition of at least one aliphatic, (cyclo)aliphatic, or cycloaliphatic polyisocyanate comprising at least one uretdione group and at least one compound comprising at least one hydroxyl, wherein the curing agent exists in solid form across an entire range below 40° C. and in liquid form across an entire range above 125° C., and has a free NCO content of less than 5 wt. % and a uretdione content of 3-25 wt. %;
      b) at least one hydroxyl group-comprising polymer, which exists in solid form across an entire range below 40° C. and in liquid form above 125° C., across an entire range and has an OH number between 20 and 200 mg KOH/gram;
      c) 0.1 to 5 wt. % of at least one catalyst selected from the group consisting of a quaternary ammonium salt and a quaternary phosphonium salt with at least one counter-ion selected from the group consisting of a halogen, a hydroxide, an alcoholate, an organic acid anion, and an inorganic acid anion;
      d) 0.1 to 5 wt. % of at least one cocatalyst selected from the group consisting of
         d1) an epoxide, and
         d2) at least one acetylacetonate cocatalyst selected from the group consisting of a quaternary ammonium acetylacetonate cocatalyst, a quaternary phosphonium acetylacetonate cocatalyst, and a combination thereof; and
      e) optionally, at least one selected from the group consisting of an auxiliary substance and a polyurethane additive,
   wherein the at least one curing agent a) and the at least one hydroxy-comprising polymer b) are present in a ratio such that for every hydroxyl group of the polymer b) 0.3 to 1 uretdione groups of the curing agent a) is consumed.

2. The prepreg of claim 1, wherein the matrix material has a Tg of at least 40° C.

3. The prepreg of claim 1, wherein the fibrous support comprises at least one selected from the group consisting of a glass, carbon, a plastic, a natural fiber, and a mineral fiber material.

4. The prepregs of claim 1, wherein the fibrous support comprises at least one planar textile body selected from the group consisting of a non-woven material, a knitted good, a non-knitted skein, a netting, a long fiber material, and short fiber material.

5. The prepreg of claim 1, wherein the at least one curing agent a) comprises at least one diisocyanate or polyisocyanate comprising at least one uretdione group.

6. The prepreg of claim 1, wherein the curing agent a) comprises at least one temporarily deactivated di- or poly-isocyanate selected from the group consisting of isophorone diisocyanate (IPDI), hexamethylene diisocyanate (HDI), diisocyanatodicyclo-hexylmethane (H₁₂MDI), 2-methylpentane diisocyanate (MPDI), 2,2,4-trimethylhexa-methylene diisocyanate/2,4,4-trimethyl-hexamethylene diisocyanate (TMDI), and norbornane diisocyanate (NBDI), said di- or poly-isocyanate being temporarily deactivated (internally blocked) by the at least one uretdione group.

7. The prepreg of claim 1, wherein the at least one catalyst c) is selected from the group consisting of tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate, tetrabutylammonium benzoate, tetrabutylphosphonium acetate, tetrabutylphosphonium formate and ethyltriphenylphosphonium acetate, tetrabutylphosphonium benzotriazolate, tetraphenylphosphonium phenolate and trihexyltetradecylphosphonium decanoate, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, methyltributylammonium methanolate, methyltriethylammonium methanolate, tetramethylammonium methanolate, tetraethylammonium methanolate, tetrapropylammonium methanolate, tetrabutylammonium methanolate, tetrapentylammonium methanolate, tetrahexylammonium methanolate, tetraoctylammonium methanolate, tetradecylammonium methanolate, tetradecyltrihexylammonium methanolate, tetraoctadecylammonium methanolate, benzyltrimethylammonium methanolate, benzyltriethylammonium methanolate, trimethylphenylammonium methanolate, triethylmethylammonium methanolate, trimethylvinylammonium methanolate, methyltributylammonium ethanolate, methyltriethylammonium ethanolate, tetramethylammonium ethanolate, tetraethylammonium ethanolate, tetrapropylammonium ethanolate, tetrabutylammonium ethanolate, tetrapentylammonium ethanolate, tetrahexylammonium ethanolate, tetraoctylammonium methanolate, tetradecylammonium ethanolate, tetradecyltrihexylammonium ethanolate, tetraoctadecylammonium ethanolate, benzyltrimethylammonium ethanolate, benzyltriethylammonium ethanolate, trimethylphenylammonium ethanolate, triethylmethylammonium ethanolate, trimethylvinylammonium ethanolate, methyltributylammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctylammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethylammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributyl-ammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutyl-ammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, and benzyltrimethylammonium fluoride.

8. The prepreg of claim 7, wherein the at least one catalyst c) is selected from the group consisting of a tetraethylammonium benzoate and tetrabutylammonium hydroxide.

9. The prepeg of claim 1, wherein the epoxide d1) comprises at least one selected from the group consisting of a glycidyl ether, a glycidyl ester, an aliphatic epoxide, a diglycidyl ether based on bisphenol A, and a glycidyl methacrylate.

10. The prepeg of claim 9, wherein the epoxide d1) comprises at least one selected from the group consisting of triglycidyl isocyanurate, a mixture of diglycidyl terephthalate and triglycidyl trimellitate, a glycidyl ester of Versatic acid, 3,4-epoxycyclohexylmethyl 3',4'-epoxycyclohexanecarboxylate (ECC), a diglycidyl ether based on bisphenol A, ethylhexyl glycidyl ether, butyl glycidyl ether, pentaerythritol tetraglycidyl ether, and a Polypox grade having at least one free epoxy group.

11. The prepeg of claim 1, wherein the acetylacetonate cocatalyst d2) is at least one selected from the group consisting of tetramethylammonium acetylacetonate, tetraethylammonium acetylacetonate, tetrapropylammonium acetylacetonate, tetrabutylammonium acetylacetonate, benzyltrimethylammonium acetylacetonate, benzyltriethylammonium acetylacetonate, tetramethylphosphonium acetylacetonate, tetraethylphosphonium acetylacetonate, tetrapropylphosphonium acetylacetonate, tetrabutylphosphonium acetylacetonate, benzyltrimethylphosphonium acetylacetonate, and benzyltriethylphosphonium acetylacetonate.

12. The prepeg of claim 11, wherein the acetylacetonate cocatalyst d2) is at least one selected from the group consisting of tetraethylammonium acetylacetonate and tetrabutylammonium acetylacetonate.

13. A process for producing the prepreg of claim 1, the process comprising:
    applying matrix material B) to the fibrous support A); and
    optionally fixing the matrix material B).

14. The method of claim 13, wherein the
    at least one curing agent a) comprises at least one diisocyanate or polyisocyanate comprising at least one uretdione group.

15. A boat, ship, a unit of aerospace technology equipment, an automobile part, bicycle part, motorcycle part, a construction material, medical engineering part, a piece of sports equipment, an electronics part, or a part in a power generating plant, comprising the prepreg of claim 1.

16. A process for producing a composite component, comprising heating the prepreg of claim 1 at a temperature of more than 100° C. up to 160° C., optionally under at least one selected from the group consisting of vacuum and pressure.

17. The prepreg of claim 1, wherein the fibrous support A) comprises at least one selected from the group consisting of a polyamide and a polyester.

18. A composite component, comprising the prepreg of claim 1.

* * * * *